March 16, 1971     H. A. SAUER     3,570,302

METHOD FOR MEASURING THERMAL DIFFUSIVITY

Filed Sept. 20, 1968

INVENTOR
H. A. SAUER
BY *Charles E. Graves*
ATTORNEY

United States Patent Office 3,570,302
Patented Mar. 16, 1971

3,570,302
METHOD FOR MEASURING THERMAL DIFFUSIVITY
Harold A. Sauer, Hatboro, Pa., assignor to Bell Telephone Laboratories, Incorporated, Murray Hill and Berkeley Heights, N.J.
Filed Sept. 20, 1968, Ser. No. 761,214
Int. Cl. G01n 25/00, 25/18
U.S. Cl. 73—15                                       4 Claims

ABSTRACT OF THE DISCLOSURE

The thermal diffusivity and specific heat of materials in thin sections is measured at low and moderate temperatures by a transient heat flow method which employs a sample probe and a dual chamber vessel. A small diameter sample is held on the probe, which is supported in the upper chamber. After the sample has been equilibrated at a chosen temperature, it is quickly lowered, mechanically, through a trap into contact with a liquid in the lower chamber, which is isolated from the upper chamber, and which is maintained at a different temperature. The lowering is conducted in such a manner that only the under or near surface of the specimen is brought in contact with the liquid. The temperature-time history of the far surface, obtained from a thermocouple attached to the center of this surface, is recorded on an oscilloscope.

FIELD OF THE INVENTION

This invention relates in general to measurement of thermal diffusivity. In particular, the invention concerns a method for calculating precisely from thermal diffusivity measurements the thermal conductivity of thin material specimens such as printed circuit board substrates and the like, the thermal conductance of thin composites, and the real or apparent specific heat.

BACKGROUND OF THE INVENTION

As printed circuit modules and integrated circuit packages become ever smaller in size, the need to know with precision the thermal conductance characteristics of the substrates on which these circuits are mounted has become quite critical. Often it is the ability to conduct and dissipate the heat generated by such circuits that determines the choice of substrate material and of composite substrate structures. As the limits of existing substrate materials and structures are approached, the search for alternatives with better heat conducting properties has required improved techniques of the aforementioned thermal diffusivity measurements.

In the past, the procedure for the direct measurement of thermal conductivity of thin, i.e., .003–.080 inch, elements of material involved a comparative technique in which the thin specimen was sandwiched between thermodes of known thermal conductivity. The principal problems with this approach to thermal conductivity measurement are the difficulty of establishing good physical and thermal contact of the specimen to the thermodes and the uncertainty in the determination of the temperature gradient across the specimen. To circumvent these difficulties investigators turned to the measurement of thermal diffusivity from which with a knowledge of the density and specific heat of the specimen, the thermal conductivity is calculated.

Current thermal diffusivity techniques for thin specimens involve either the application of heat pulses from laser beams or flash lamp sources, or the application of modulated electron beams. Inherently, with both these heat wave methods, the experimental techniques are complicated and the measurements are time consuming and difficult to effect. Moreover, they are oriented toward high temperature measurements in which duration of energy pulse and radiation losses from the impinging surface have introduced additional complications in the procedure and in the mathematical expressions for calculating thermal diffusivity. Further, since the sample, in these techniques, is exposed to an evacuated environment during measurement, temperature conditioning and control in the below-ambient region is difficult to achieve in the same experimental set-up as is employed for the above-ambient measurements.

Accordingly, one object of the invention is to measure accurately and speedily the thermal diffusivity and specific heat of thin material sections, especially in the low and moderate temperature range.

Another object of the invention is to facilitate the search for materials for printed circuit substrates.

A broader object of the invention is to realize an alternative to existing thermal conductivity measurement techniques for all categories of thin materials.

SUMMARY OF THE INVENTION

In accordance with the invention, thermal conductivity measurements on a thin element are achieved by establishing a stable temperature differential between two thermally isolated but contiguous chambers, placing the substrate on a probe in the upper chamber until the probe is temperature stabilized, and then quickly injecting the probe and substrate through a trap between chambers and into contact with a temperature-controlled liquid in the second chamber.

The resulting time-temperature history of the far surface, as measured at its center provides the necessary and sufficient information for calculating the thermal diffusivity. At the same time, it provides the necessary and sufficient information for calculating the specific heat when compared with the time-temperature response of a sample of material of known specific heat of the same geometry and under the same test conditions.

In a specific embodiment of the invention, a printed circuit board substrate shaped in the form of a thin disc is provided with an evaporated gold plating on the far surface. To this a thermocouple is attached as by ultrasonic bonding. The substrate is housed at the end of a metallic probe. With the use of gaseous heat exchange carriers, such as nitrogen, the respective temperatures of the two contiguous chambers are established and their differential, say, of 25 degrees C., is carefully maintained. Once the probe and substrate are also temperature stabilized in the upper chamber, the probe is rapidly lowered through a trap into the second chamber, with only its near surface making contact with the liquid bath therein.

A flow of heat between the liquid and the substrate occurs, and a change of current is generated in the thermocouple. This change of current reflects a change in temperature of the far surface in the direction of the near surface. Advantageously, this signal is applied for example, to the vertical trace of an oscilloscope, the horizontal input being time triggered by contact of the substrate with the liquid. Since a considerable change in temperature in these thin elements occurs in less than a second, it is desirable to photograph the time-temperature trace. The magnitude of change in unit time, all other parameters being maintained constant, is a function of the differential cryostat-thermostat temperature.

A principal feature of the inventive method, accordingly, involves the use of two contiguous thermal chambers whose temperatures are carefully controlled by gas heat exchange media, and a probe which rapidly transports a thin measurement specimen from one to the other, the temperature change being measured by thermocouples.

An added feature of the invention is the synchronization of the movement of the probe and trap door, which enables the rapid relocation of a specimen from one chamber to a second without significant heat loss during this procedure.

The invention, its further objects, features, and advantages may be readily apprehended from a reading of the description to follow of an illustrative embodiment thereof.

DETAILED DESCRIPTION OF AN ILLUSTRATIVE EMBODIMENT

Figure 1:
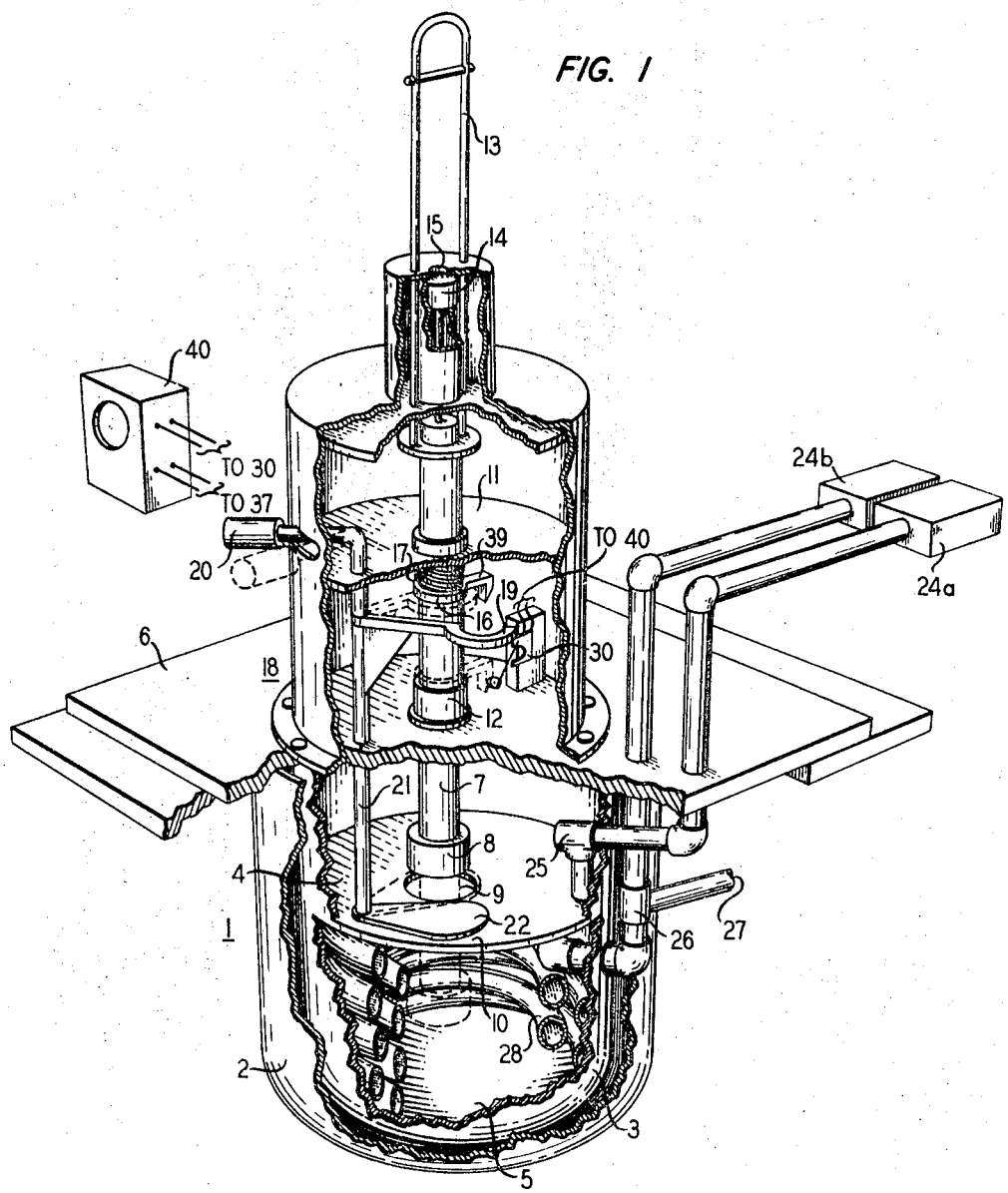
FIG. 1 is a perspective frontal view of a preferred item of apparatus which practices the invention.

Although the inventive embodiment about to be described relates specifically to thermal diffusivity measurements on a thin specimen, it will be obvious that the method and equipment alike are applicable to any materials of variable thickness provided that the boundary conditions required by theory can be met; and, accordingly, to specific heat and thermal conductivity determinations as well.

THERMODYNAMICS OF THE METHOD

The problem of measuring thermal diffusivity of a thin specimen by this method resolves analytically into measuring the temperature change at the far surface of a specimen due to a sudden and dramatic change in temperature at the near surface. This change stems from unidirectional flow of heat through a specimen which has plane parallel faces of separation thickness $l$. The heat flow is considered to be normal to these faces. The sample is brought to some initial equilibrium temperature. At time $t=0$, the near face, at $x=0$ is brought in contact with a heat source or sink which is at a constant temperature. The other or far face (at $x=l$) is assumed to be perfectly insulated at all times except from the thermal effects of the near face. A flow of heat commences in the direction of the dimension $l$.

The classical differential equation for unidirectional heat transfer by conduction in a medium in which the temperature is changing with time is given by:

$$\frac{\partial \theta}{\partial t} = D_H \frac{\partial^2 \theta}{\partial x^2} \qquad (1)$$

At a time $t>0$, the temperature of the specimen face opposite the liquid contacting face has reached a value $\theta$.

Given the following set of boundary conditions:

$$t=0,\ \theta=0$$

$$t>0,\ \theta=\theta' \text{ at } x=0$$

$$t>0,\ \frac{\partial \theta}{\partial x}=0 \text{ at } x=l$$

$\theta$ and $\theta'$ being in degrees C., the mathematical form of the solution of Equation 1 is:

$$\theta = \sum_{N=0}^{N=\infty} (-1)^N \cdot \theta' \cdot 2 \cdot erfc \frac{(2N+1) \cdot l}{2\sqrt{D_H \cdot t}} \qquad (2)$$

where $\theta$ is the temperature of the distant face, and $\theta'$ is the temperature of the near face, choosing a temperature scale where the initial temperature is everywhere zero.

$$\frac{\theta}{\theta'} = \sum_{N=0}^{N=\infty} (-1^N \cdot 2 \cdot erfc \frac{(2N+1) \cdot l}{2\sqrt{D_H \cdot t}} \qquad (3)$$

If only the first term, $N=0$, of the series is considered, Equation 3 becomes $$\frac{\theta}{\theta'} = 2\ erfc \frac{l}{2\sqrt{D_H \cdot t}} \qquad (4)$$

In the measurement of the thermal diffusivity by the experimental methods to be described below, it is convenient to let $$D_H = D_1 \cdot \frac{l^2}{t} \qquad (5)$$

Thus Equation 4 reduces to $$\frac{\theta}{\theta'} = 2\ erfc \frac{1}{2\sqrt{D_1}} \qquad (6)$$

The significance of Equation 6 is that both $\theta/\theta'$ and $D_1$ are dimensionless quantities. Accordingly, for arbitrarily chosen values of $\theta/\theta'$, a value of $D_1$ can be computed for each value of $\theta/\theta'$. Experimentally this means that if $\theta/\theta'$ is chosen as a parameter of the test prior to the measurement, the corresponding value of $D_1$ becomes a parameter of the test Equation 5. Since the thickness $l$ of the sample is known, the value of the thermal diffusivity, $D_H$, is determined from the time, $t$, required for the far face to change in temperature by an amount which satisfies the ratio $\theta/\theta'$.

EXEMPLARY APPARATUS

A preferred example of a facility for the practice of the inventive method is depicted in FIG. 1 which shows an overall thermal diffusivity measuring facility, which might appropriately be termed a cryostat-thermostat. Cryostat-thermostat 1 consists of an outer shell 2, and an inner shell 3. The latter consists of an upper chamber 4 and a lower chamber 5, which is thermally isolated from chamber 4. The chambers 4, 5 are conveniently mounted to the underside of a plate 6 which could be positioned over a suitable laboratory recess, for example.

Figure 2:
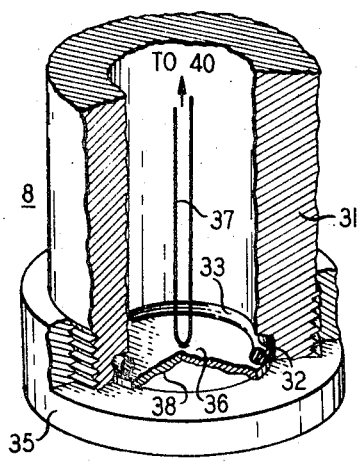
FIG. 2 is a front detail view of the plunger cap, substrate, and thermocouple assembly.

The assembly for manipulating a specimen to be tested consists of a probe 7 and a sample holder 8, the latter being shown in detail in FIG. 2. The probe assembly is suitably mounted for vertical movement within the apparatus; thus permitting movement of sample holder 8 through a trap 9 in the plate 10 which divides chambers 4 and 5. Probe 7 is vertically located by the guideplate 11 and the bushing 12 below it. A probe lifter 13 is attached to the top of probe 7 and emerges from the enclosure to serve as a means for raising the sample holder after a measurement has been conducted. A vacuum cylinder 14 and associated vacuum adjustment valve 15 provide a convenient routine adjustment for the rate of plunge of the probe 7.

To the probe 7 is attached a flange 16, and a loading spring 17 is engaged between the flange 16 and the underside of guideplate 11. A plunging and trap control assembly, designated 18, includes an arm 19 that engages the underside of flange 16, thus fixing the raised position of probe 7. In such position, sample holder 8 is fully within the upper chamber 4. The swivable control lever 20 rotates the linkage 21 to the trap door 22.

Door 22 is closed over the circular trap 10 while the chambers 4, 5 and the specimen are being temperature equilibrated. Rotation of the lever 20 first opens door 22 and then releases the probe flange 16, which permits the spring 17 to inject the probe and sample holder into lower chamber 5.

Advantageously, upper chamber 4 is temperature controlled by a gas, and chamber 5 contains a liquid 23 which is temperature controlled. Pursuant to the preferred construction of the present apparatus, gaseous heat carriers are employed for temperature control. Gas such as nitrogen from a first temperature-controlled source 24a is introduced into upper chamber 5 through the gas diffuser 25. Nitrogen gas from a second temperature-controlled source 24b feeds into lower chamber 5 through the gas diffuser 26 which also allows introduction of nitrogen gas at ambient temperature through inlet 27. The gas is circulated in lower chamber 5 through the cooling coils 28 and thereafter fed into diffuser 25. Drains for each of the chambers 4, 5, the thermocouples in these chambers which monitor the temperature therein and other associated routine apparatus are omitted from FIG. 1 for the sake of clarity.

As seen in FIG. 2, the sample holder 8 consists of a hollow cylindrical section 31 forming the end of probe 8, with an exterior threaded portion. The interior of section 31 is provided with a seat 32 into which an O-ring 33 fits. O-ring 33 is advantageously made of gold to withstand a wide range of possible temperatures.

PRACTICE OF THE THERMAL DIFFUSIVITY MEASURING METHOD

A thin specimen 40 such as shown in FIG. 2 is affixed to sample holder 8 and the latter is positioned in the upper chamber 4. Chamber 4 is brought to a conveniently chosen initial temperature equilibrium, which defines the reference temperature from which $\theta$ and $\theta'$ are calculated. Liquid 23 in lower chamber 5 simultaneously is brought to a fixed temperature, for example, chosen to be approximately 25 degrees C. higher or lower than the temperature in chamber 4. The gaseous heat carriers permit the establishment and control of a temperature difference between the two chambers over a wide temperature range stemming from well below ambient to well above.

The material specimen 34 is prepared by coating its far face 36 with evaporated gold and at the center attaching a thermocouple 37 with an ultrasonic or thermocompression bond, for example. Specimen 34 then is placed in seat 32 and a threaded cap 35 attaches to cylinder 31 to secure the specimen in the seat 32 against O-ring 33. The near side 38 of specimen 34 is exposed to the ambient outside of probe 7 which, in chamber 5, is the liquid 23. The interior and far side 36 are protected from any extraneous thermal disturbance other than that which originates on near side 38.

When the specimen 34 equilibrium is reached as indicated by thermocouple 37, the plunging and trap door control 20 is actuated manually, permitting the probe and sample holder to drop rapidly into lower chamber 5. Its travel is controlled to an amount just sufficient to enable the specimen near side 38 to contact the surface of liquid 23. At the moment that the near side 38 contacts the liquid surface, a transfer of heat is initiated through the sample. Simultaneously, a microswitch 30 is actuated by contact with the extension 39 of arm 19, which trips the horizontal sweep circuit of an oscilloscope 40. The synchronization of the onset of the heat transient and the oscilloscope's sweep pattern results in the reproducible recording of the signal provided by thermocouple 37. At the conclusion of the heat transient, probe 7 is lifted manually by lifter 13 back into the upper chamber 4, and the doors 22 are closed.

The liquid 23 preferably is of low viscosity and low surface tension over its useful temperature range to permit intimate contact to the near side 38 of specimen 34.

EXAMPLE

Suppose that it is desired to calculate $D_H$, the thermal diffusivity of a specimen, at a temperature of 200 degrees C. The initial equilibrium temperature in chamber 4 thus is 200 degrees C.; and the sudden change in temperature of near side 38 is conveniently selected as being from 200 degrees C. to 225 degrees C. Accordingly, liquid 23 is brought to a temperature of 225 degrees C. The specimen thickness $l$ is 0.025 inch. The probe 7 is plunged and it is found that after 0.0125 second, $\theta$ (the temperature change occurring on far face 36) is 15 degrees C. in accordance with a predetermined ratio $\theta/\theta'=0.600$. The corresponding value of $D_1$ is 0.469. From Equation 5 $D_H$ is calculated to be 0.15 cm.$^2$ per second. The temperature range of interest can be explored by raising or lowering temperatures of the chambers 4, 5 and repeating the operation.

The measurement techniques are amenable to a wide variety of substrate structures including, for example, unglazed ceramic such as alumina, beryllia and alkaline earth porcelains; to glazed ceramics and to vitreous enamel on metal. The techniques described are useful in studying the effects of thickness of glaze or enamel, nature of interfaces, devitrification or recrystallization in glaze or enamel, intimacy of contact between metal film and substrate, and power dissipated in resistance films.

In addition to its applicability to substrate material studies, however, the inventive method is also germane to composites such as layered structures, glass bonded mica plastic laminates and filled plastics; to metallized bonding layers on ceramics; and to ceramic-to-metal seals.

It is to be understood that the embodiments described herein are merely illustrative of the principles of the invention. Various modifications may be made thereto by persons skilled in the art without departing from the spirit and scope of the invention.

What is claimed is:
1. A method for measuring thermal diffusivity between parallel top and bottom major surfaces of a thin specimen comprising the steps of:
   establishing an initial stable temperature in the specimen by exposing same to gaseous heat exchange carriers;
   thereafter rapidly bringing substantially all points on the bottom surface only, into intimate total and substantially simultaneous contact with a liquid stabilized and maintained at a temperature different from said initial temperature;
   measuring the temperature of said top surface at its center as a function of time; while
   precluding the lateral flow of heat at said specimen center during the measurement interval.
2. A method in accordance with claim 1, wherein said specimen thickness is in the range of 0.005 to 0.050 inch.
3. A method in accordance with claim 2, wherein said measuring step is commenced the instant said specimen contacts said liquid surface.
4. A method pursuant to claim 3, wherein the difference between the initial specimen temperature and the temperature stabilized liquid is of the order 25 degrees C.

References Cited

UNITED STATES PATENTS

| | | | |
|---|---|---|---|
| 3,123,996 | 3/1964 | Musial | 73—15 |
| 3,148,531 | 9/1964 | Stoll et al. | 73—15 |
| 3,365,930 | 1/1968 | Arias | 73—15 |

JAMES J. GILL, Primary Examiner

H. GOLDSTEIN, Assistant Examiner